Aug. 22, 1961 W. T. SLATER 2,996,953
OPTICAL PROJECTION MEANS FOR TRANSMITTING INFORMATION
Filed June 2, 1959
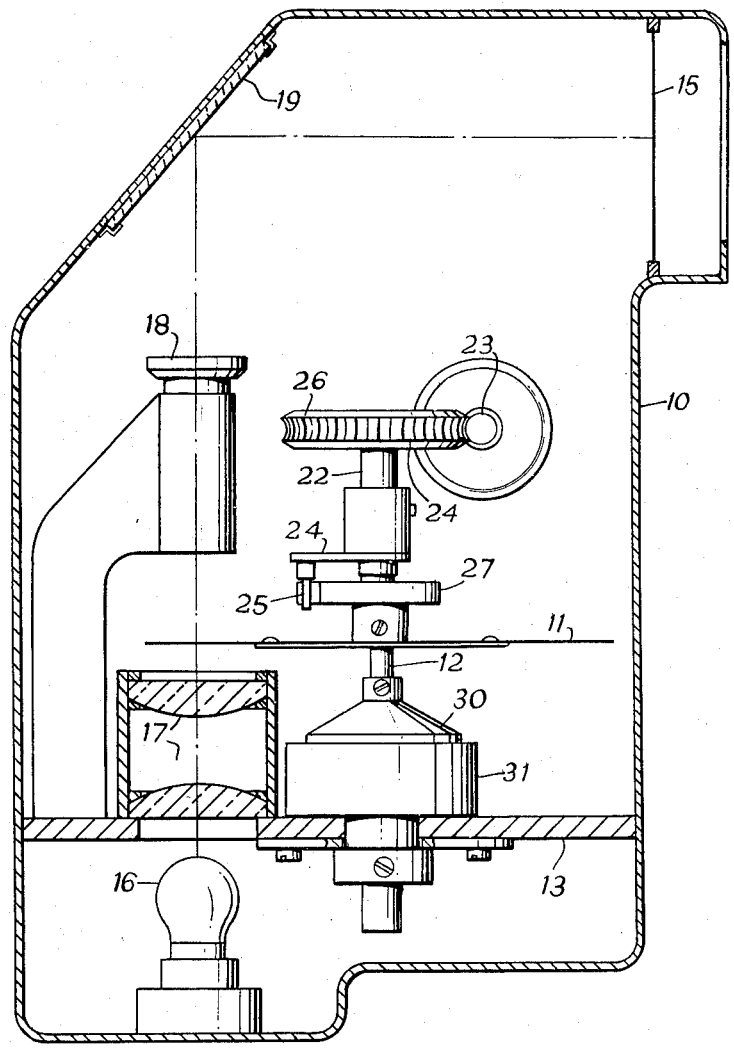
William Thornton Slater
INVENTOR
BY
Moore and Hall
ATTORNEY

2,996,953
OPTICAL PROJECTION MEANS FOR TRANSMITTING INFORMATION

William Thornton Slater, Hillington, Glasgow, Scotland, assignor to Kelvin & Hughes Limited, Glasgow, Scotland, a British company
Filed June 2, 1959, Ser. No. 817,523
Claims priority, application Great Britain June 6, 1958
7 Claims. (Cl. 88—24)

This invention relates to means for transmitting information by means of an indicating device driven by a step-by-step driving means and has particular reference to ships' compass systems in which the cards are driven by the repeaters that move in a series of steps.

Where the diameter of the card is relatively small or where the card is viewed from a distance of more than, say, ten times its diameter, the steps are no longer visible.

There is, however, an increasing tendency to produce either actually or in effect the equivalent of much larger diameter cards. Repeaters are known to provide indications which are equivalent to a card having a diameter of, say, three feet. When such repeaters are viewed at normal distances of, say, nine feet, the intermittent motion of the card, especially when oscillating over a few degrees, becomes easily visible and is extremely tiring to the eyes of the helmsman.

It is the object of this invention to provide means in a step-by-step information transmission system for presenting the information on an indicator from which the effects of the intermittent motion have been substantially removed.

According to the present invention an apparatus for transmitting information comprises an indicator member which is movable to indicate the transmitted information which member is driven by a step-by-step driving means, resilient means operatively interposed between said driving means and said member and damping means interposed between said indicator member and a fixed part of the apparatus, whereby the indicator member has a more even motion than the step-by-step driving motion.

A constructional form of the invention will now be described by way of example with reference to the accompanying drawing which is a side elevation of a repeater compass made in accordance with the invention with part of its casing removed to show interior working parts.

The compass comprises a casing 10 containing a compass card 11 carried by a spindle 12 that is rotatably mounted on low friction bearing on a base plate 13.

The compass card is made of transparent mica having compass scale markings formed thereon photographically. These markings are projected on an enlarged scale on to a screen 15 by means of a lamp 16, condenser lens system 17, projection lens 18, and mirror 19.

A repeater motor 20 is driven by a compass transmitter (not shown) and in turn imparts a step-by-step motion to a spindle 22 through a worm 23 and worm-wheel 26. The spindle 22 is coaxial with the compass card spindle and carries a radially projecting arm 24 which in turn carries an eccentrically located pin 25. This pin is fixed to the outer end of a weak spiral spring 27 the inner end of which is fixed to the compass card spindle 12.

In this way, the spring 27 acts as a resilient coupling between the gear wheel 24 and the spindle 12.

A fly wheel 30 carried by the spindle 12 rotates in a cup 31 that contains silicone fluid. As the shaft of the repeater motor turns, it drives the gear wheel and hence the spindle through the weak spring device. Any intermittent motion of the spindle 12 is resisted by the viscous drag of the silicone fluid so that the card tends to lag with a resultant extension of the spring 27. In this way the compass card tends to lag behind the true position but when the spindle 12 ceases to turn, the compass card will adjust itself to the true position under the action of the spring 27.

If desired, a flywheel may be attached to the outer edge of the card. The inertia of the flywheel will then combine with the viscous drag of the silicone fluid to oppose intermittent motion of the spindle.

As an alternative, the viscous drag damping means may be replaced by eddy current damping e.g. by the known device of a copper cup and a permanent magnet.

In a further modified construction the viscose fluid is disposed between a fixed ring and the outer margin of the compass card.

I claim:

1. Apparatus for transmitting information in a ship's compass system comprising a movable indicator member constructed to indicate the transmitted information, step-by-step driving means connected to drive said movable member, projection means for projecting an enlarged image of a portion of said indicator member, resilient means operatively interposed between said driving means and said member and damping means interposed between said indicator member and a fixed part of the apparatus, whereby the indicator member has a more even motion than the step-by-step driving motion and the enlarged image of said indicator member moves smoothly for easy observation over prolonged periods.

2. Apparatus as claimed in claim 1 wherein the resilient means is a spring.

3. Apparatus as claimed in claim 2 wherein the damping means is a rotary member disposed in a viscous fluid.

4. Apparatus as claimed in claim 3 wherein the indicator member is a rotary disc and the damping means comprises a member mounted on the disc adjacent a co-operating part of the damping means.

5. Apparatus as claimed in claim 4 wherein the driving means is a repeater motor which drives a spindle through a worm and worm-wheel, said spindle carrying a radially extending arm that is coupled with the outer end of said resilient means in the form of a spiral spring, the inner end of said spring being connected to a spindle which carries the indicator member and part of the damping means.

6. Apparatus as claimed in any of the preceding claims wherein the indicator member is a compass card.

7. Apparatus as claimed in claim 6 wherein the compass card is transparent and carries indicator marks which are projected on to a screen by a lamp and lens system.

References Cited in the file of this patent
UNITED STATES PATENTS

| | | |
|---|---|---|
| 1,110,318 | Field et al. | Sept. 15, 1914 |
| 1,962,303 | Greibach | June 12, 1934 |
| 1,962,367 | Smythe | June 12, 1934 |
| 1,963,753 | Mallina | June 19, 1934 |
| 2,714,330 | Frederickson | Aug. 2, 1955 |